United States Patent
McConnell

(10) Patent No.: US 6,427,554 B1
(45) Date of Patent: Aug. 6, 2002

(54) AXIAL DISPLACEMENT MECHANISM

(75) Inventor: Collin Nicholas McConnell, Bradford (GB)

(73) Assignee: Meltog Limited, Birstall (GB)

( * ) Notice: Subject to any disclaimer, the term of this patent is extended or adjusted under 35 U.S.C. 154(b) by 0 days.

(21) Appl. No.: 09/580,737

(22) Filed: May 27, 2000

(30) Foreign Application Priority Data

May 27, 1999 (GB) .............................................. 9912268

(51) Int. Cl.$^7$ .......................... B23B 29/24; B23Q 16/00
(52) U.S. Cl. ...................................... 74/826; 74/813 L
(58) Field of Search ............................. 74/813 R, 816, 74/826, 813 L

(56) References Cited

U.S. PATENT DOCUMENTS

| | | | | |
|---|---|---|---|---|
| 3,628,400 A | * | 12/1971 | Chope | 74/826 |
| 3,760,655 A | * | 9/1973 | Buchmeier | 74/826 |
| 3,835,516 A | | 9/1974 | Fullerton | |
| 3,877,323 A | | 4/1975 | Vetsch | |
| 4,038,891 A | | 8/1977 | Zaninelli | |
| 4,109,552 A | * | 8/1978 | Imoberdorf | 74/813 L |
| 4,128,361 A | * | 12/1978 | Golwas et al. | 74/813 L |
| 4,202,227 A | * | 5/1980 | Thumm | 74/813 L |
| 4,244,247 A | * | 1/1981 | Zaninelli | 74/813 L |
| 4,355,548 A | | 10/1982 | Svensson et al. | |
| 4,669,948 A | | 6/1987 | Moller | |
| 4,944,198 A | * | 7/1990 | Natale et al. | 74/813 R |
| 4,972,744 A | * | 11/1990 | Sauter et al. | 74/813 L |
| 5,178,040 A | * | 1/1993 | Schmidt | 74/813 L |
| 5,344,090 A | | 9/1994 | Nakai et al. | |
| 5,813,666 A | * | 9/1998 | Berchtold | 269/225 |

* cited by examiner

Primary Examiner—Robert E. Pezzuto
Assistant Examiner—Nathan Mammen
(74) Attorney, Agent, or Firm—Bell, Boyd & Lloyd LLC

(57) ABSTRACT

An axial displacement mechanism for precisely adjusting the axial displacement of a turret plate relative to a turret table is disclosed. Turret tables are commonly used to support a workpiece such as the hollow tubular section of a tin box immediately prior to the seaming of a lid thereto and are commonly angularly indexed between a plurality, usually four, separate work stations disposed above the turret plate. The turret table is rigidly secured to a frame while the turret plate must be capable of being axially displaced relative thereto to suit a variety of different components. The turret plate is rigidly secured to an annular bush through a central aperture of which passes a cylindrical screw, the threads of which engage in corresponding threads in the inner annular surface of the bush. The screw abuts an axially fixed portion secured to or being a drive spindle which imparts motion to said fixed portion, said annular bush and said screw to cause the turret plate to rotate. The provision of threads on the outside of the cylindrical screw and the abutment thereof with the spindle or fixed portion ensures that the rotation of the screw causes axial displacement of the annular bush and thus the turret plate relative to the turret table while the screw remains axially static. Guide mechanisms in the form of cylindrical pegs provided in the axially fixed portion are received through apertures in the annular bush to guide same and prevent angular displacement thereof as it is axially displaced. Locking mechanisms are provided to lock the screw to the spindle or other fixed portion to prevent unwanted rotation of same during rotation of the turret plate.

6 Claims, 7 Drawing Sheets

AXIAL DISPLACEMENT MECHANISM

This invention relates to an axial displacement mechanism, and more specifically to a axial displacement mechanism specifically adapted for a turret table for use in machinery for the automated manufacture of tin boxes.

Although the following description is provided with exclusive reference to such machinery, it is to be mentioned that the axial displacement mechanism described could easily be applied to any surface which is required to be precisely orientated and disposed with respect to a tool or the like which works on a body or collects such a body from said surface, the precision being required to ensure faultless operation of the tool.

Automated tin box manufacture is accomplished by juxtaposing several different pieces of machinery and providing transfer means therebetween. Tin boxes can be manufactured in a vast number of different shapes and sizes and accordingly a single piece of machinery is required to be sufficiently versatile to enable manufacture of tin boxes in a large number of said shapes and sizes. It will be understood by those skilled in the art that the machinery used has a number of different components which can be exchanged to facilitate the manufacture of different boxes and currently the length of time taken to exchange all these various components to enable a particular set of machines to manufacture a different box shape can be up to an entire day. The invention hereinafter set forth, and also set forth in our co-pending applications have as their object the reduction of this time. Any reduction achievable in the "changeover" time is especially desirable when it is considered that tin box production rates using the machinery described hereinafter may reach 40 per minute.

Tin boxes can contain a wide variety of different goods, such as bottles, chocolates, biscuits, tea, coffee and the like. Manufacturers of such products commonly consider the containment of their product in tins because of the rigidity and durability which the sheet steel, from which such tins are commonly made, provides. Additionally, the containment of a product in a tin box may also suggest that the product therein is of a certain quality, especially as ornate and detailed print effects can be obtained on the surface of the metal plates from which the tin boxes are manufactured. Such effects cannot be achieved, or are achieved only to a much lesser degree by the containment of products in cardboard cartons or receptacles of plastics materials. A tin box in which such a product is contained has the further advantage of being reusable to contain other household items such as screws, nuts bolts, pencils and pens, etc. after the product originally contained therein has been consumed or otherwise utilised.

The various separate machines required in the manufacture of tin boxes are an "Automatic Curling Notching and Beading" machine, a "bodymaker", a "round and irregular seamer", and an "end feeder", each of which has a specific task to perform during the process of tin box manufacture. Each of these is now described.

The first stage in the process of automated tin box manufacture is the profiling of a simple sheet steel, and generally rectangular, blank from which the walls of the tin box are ultimately constituted. The blank is fed through an "Automatic Notching, Curling and Beading" machine, referred to hereinafter as an ANCB machine. This machine consists of a plurality of consecutively driven rollers disposed both above and below the blank as it passes therebetween, each of said rollers performing a forming step on the blank. The particular profile of each blank as it exits the ANCB machine depends on the ultimate shape of the tin, but in general the blank is substantially flat with the exception of a hem provided parallel with one of the longer edges of the blank and proximate thereto, a bead is provided on one of said longer edges, a partial curl is provided around the alternate longer edge, and a pair of hooks oppositely disposed with respect to one another on the shorter edges. Additionally, the ANCB machine has cutting means which notch the corners of the blank to preclude any interference effects which may be caused by said corners either when the blank is profiled and provided with the hooks along its shorter edges, when it is formed into the cross-sectional shape of the tin box, or when wrapped around and attached to the base of said tin box.

The hem provides a surface behind which the beaded lip of a tin lid can engage to inhibit the removal of a lid separately formed and applied around the uppermost edge of the tin box, the bead is provided to hide the sharp longer edge of the blank which ultimately forms said uppermost edge of the tin box, the partial curl on the alternate longer edge of the blank is provided to facilitate the attachment of the blank, after same has been formed into the desired cross-sectional shape, to the base of the tin box, and the hooks provided along the shorter edges of the blank facilitate the connection of said edges to one another after the forming operation.

The profiled blank is then fed from the ANCB machine into a bodymaker by a feed mechanism which generally comprises a pair of reciprocating feed bars whose motion is best described as being that of a "walking beam" in conjunction with "disappearing guides" which simultaneously urge the profiled blank towards and over a forming mandrel and precisely align said blank thereon. The disappearing guides are rotated away from the blank when it is held in contact with the uppermost portion of the mandrel, which is generally of similar shape to the desired cross-sectional shape of the tin box to be manufactured, by a mandrel clamping arrangement. The removal of the disappearing guides (so-called because they are retracted and seem to "disappear" within the machine during the forming of the blank around the mandrel) allows a pair of forming wings pivotally connected together and disposed above the mandrel to rotate about their pivot and form said blank, which is at this stage still substantially planar, around the said mandrel. The forming operation performed by the wings also constrains the oppositely disposed flanges on the shorter edges of the blank to interlock on the underside of the mandrel whereupon a second forming tool compresses the metal of the blank in the interlocked region to form the vertical seam within the wall of the tin box. During all forming operations the blank is clamped against the upper surface of said mandrel by said mandrel clamping arrangement.

The bodymaker thus forms the walls of the tin box into the desired cross-sectional whereafter the hollow wall section is fed into the round and irregular seamer which seamingly attaches a base provided with a peripheral flange by simultaneously compressing and deforming said peripheral flange and the partial curl provided on one of the edges of the blank together to form a seam. In practice, the bodymaker is responsible for the formation of the hooks on the shorter edges of the blank to facilitate connection of said edges to one another.

The seamer is conventionally juxtaposed with the bodymaker and an end feeder, these two pieces of machinery providing the body of the tin box and its base respectively which are connected together by the seamer. The seamer is also provided with a turret table which intermittently rotates, the intermittency dependent on the rate of production of tin boxes, the duration of the various forming steps throughout the production process, and the rate of infeed of blanks.

This invention is specifically concerned with the provision of an axial displacement mechanism for the turret plate of the seamer which ensures precise angular orientation of said turret plate with respect to the various stations which said table serves, and also precise axial disposition with respect to each of these stations and to the seaming chuck of the seamer.

The turret plates currently in use on seaming machines are generally circular or quadrangular and rotate periodically by approximately 90° every rotation and also always in the same direction. Said turret plates are provided with apertures and overlie a turret table which is rigidly secured to a frame which does not rotate. The surface of the turret table is generally smooth over its upper surface such that the hollow tubular portion of a partially complete tin box in contact therewith around one of its perimetral edges can slide unimpeded thereacross as the turret plate rotates above. It will be understood by those skilled in the art that the tubular portion stands vertically on said turret table and it is the free perimetral edge thereof to which a base is to be seamed in the seaming chuck. The turret plate provides support for said tubular base portion around the free perimetral edge thereof thus preventing the tubular portion from falling over as it moves over the turret table.

A base for the tubular portion is supplied by an end feeder adjacent one of the four positions in which the turret table and plate are disposed during stepwise rotation of said turret plate. Said end feeder positions the substantially planar pre-formed base on the turret plate over one of the apertures thereof before the turret plate is rotated to the seaming station. The separation of the turret table which supports the tubular portion of the box and the turret plate is such that the uppermost, free perimetral edge of the tubular portion is marginally lower than the upper surface of the turret plate by which the planar base is supported, and accordingly said uppermost edge of the tubular portion is not in contact with the lower surface of the planar base.

After the turret plate is rotated into position underneath the seaming chuck of a round and irregular seamer, thus causing the tubular portion and base to move also, an actuation mechanism underneath the turret table urges the tubular portion upwardly such that its uppermost edge comes into contact with the planar base and lifts same above the upper surface of the turret plate. In this condition, the upper region of the tubular portion stands proud of the turret plate to allow the seaming chuck to act around the uppermost edge and seam the planar base thereto.

After the seaming operation is completed, the tin box is allowed to drop back onto the turret table, and the turret plate again rotates to a station where either the tin box is filled or removed.

Turret tables are usually rigidly secured to a supporting frame and do not rotate, whereas turret plates are commonly connected to a rotationally driven spindle by means of a taper lock bush. Such connection consists of a frusto-conical member which is disposed in a hollow end of the spindle and which is expanded as a bolt is screwed therethrough. The bush engages the inner walls of the hollow portion of the spindle as it expands and so secures the turret plate thereto. Such means of connection of the turret plate to the spindle allows the turret plate to move with two degrees of freedom (i.e. axially and rotationally), and although the turret plate may be provided with key means to ensure correct angular orientation with respect to the turret table, it is essential to accurately fix the axial separation of the turret table and turret plate because the distance between the turret plate and the seaming chuck must be constant. The relative height of the seaming chuck with respect to the turret table can be altered by raising or lowering said seaming chuck, and therefore different heights of tubular portions to which a base is to be seamed can be accommodated, but precise axial positioning of the turret plate is required to ensure that when the tubular portion is raised, its uppermost perimetral edge stands proud of the upper surface of the turret plate by a uniform amount. It will be appreciated by those skilled in the art that the precise axial positioning of a turret plate secured to a drive shaft by a taper lock bush can be time consuming and prone to human error.

It will also be understood from the above that imprecise angular orientation of the turret plate with respect to the various stations which it serves can result in production inefficiencies, as the entire process must be stopped to correctly align the table. This is a further disadvantage which the invention seeks to overcome.

It is the object of the invention to provide a turret plate axial displacement mechanism which ensures precise axial positioning of said plate with respect to the turret table and seaming chuck, and also to ensure precise angular orientation of said turret plate relative to the turret table.

According to the invention there is provided an axial displacement and locking mechanism for a turret plate rotationally driven by a spindle to which said mechanism is rigidly secured or with which said mechanism in integral, said mechanism allowing for precise adjustment of angular and axial orientation of said turret plate, said mechanism comprising an axially fixed portion and an axially movable portion, said axially fixed portion comprising location means which are received in the movable portion and prevent same from rotating relative to the fixed portion, characterised by screw means which are provided with threads which engage corresponding threads in the axially movable portion such that rotation of the screw means causes the axially movable portion to rise or fall relative to the fixed portion on the location means.

Preferably the screw means abut the fixed portion.

Preferably said screw means also comprises secondary screw means which can be received in a threaded aperture within the fixed portion to lock said axially movable portion at a particular axial displacement relative to said fixed portion.

Preferably the plate is connected to the axially movable portion.

Preferably the axially movable portion comprises an annular bush the centre of which engages with the screw means and which is provided with a plurality of apertures to allow for connection of the plate with bolts or the like.

Preferably the annular bush comprises spacer means which extend the overall height of the annular bush and allow for the connection of a plate at the uppermost extremity thereof.

The axial displacement mechanism described above represents a significant advance of existing turret table/plate mechanisms because not only is the possibility of relative angular rotation between the turret plate, the turret table and the drive shaft precluded, there is provision for infinitesimal axial displacement of said plate without any requirement to support said plate during the adjustment. Previously, it was necessary to insert packing blocks between the table and plate such that the plate was supported by the table during axial displacement of said plate relative to said table. The plate is supported by the screw means which abut the fixed portion of the mechanism or the uppermost end of the drive shaft. Hence axial displacement is rendered simple, quick and effective.

Furthermore, the capability for adding spacer elements into the mechanism construction increases the versatility of the mechanism as a whole and allows for a far greater range of tin box depths to be accommodated on the turret table.

It is to be mentioned that the word "fixed" herein means precluded from moving axially of the adjustment mechanism as opposed to being axially movable, except where the contrary is immediately apparent. Indeed the "fixed portion" as referred to hereinbefore and after is rotationally driven by virtue of its connection to the spindle.

A specific embodiment of the invention is now described with reference to the accompanying diagrams provided by way of example, wherein:

FIG. 1A shows a horizontal sectional view through A—A as shown in FIG. 1, and also shows the section I—I from which FIG. 1 is derived;

Figure 1:
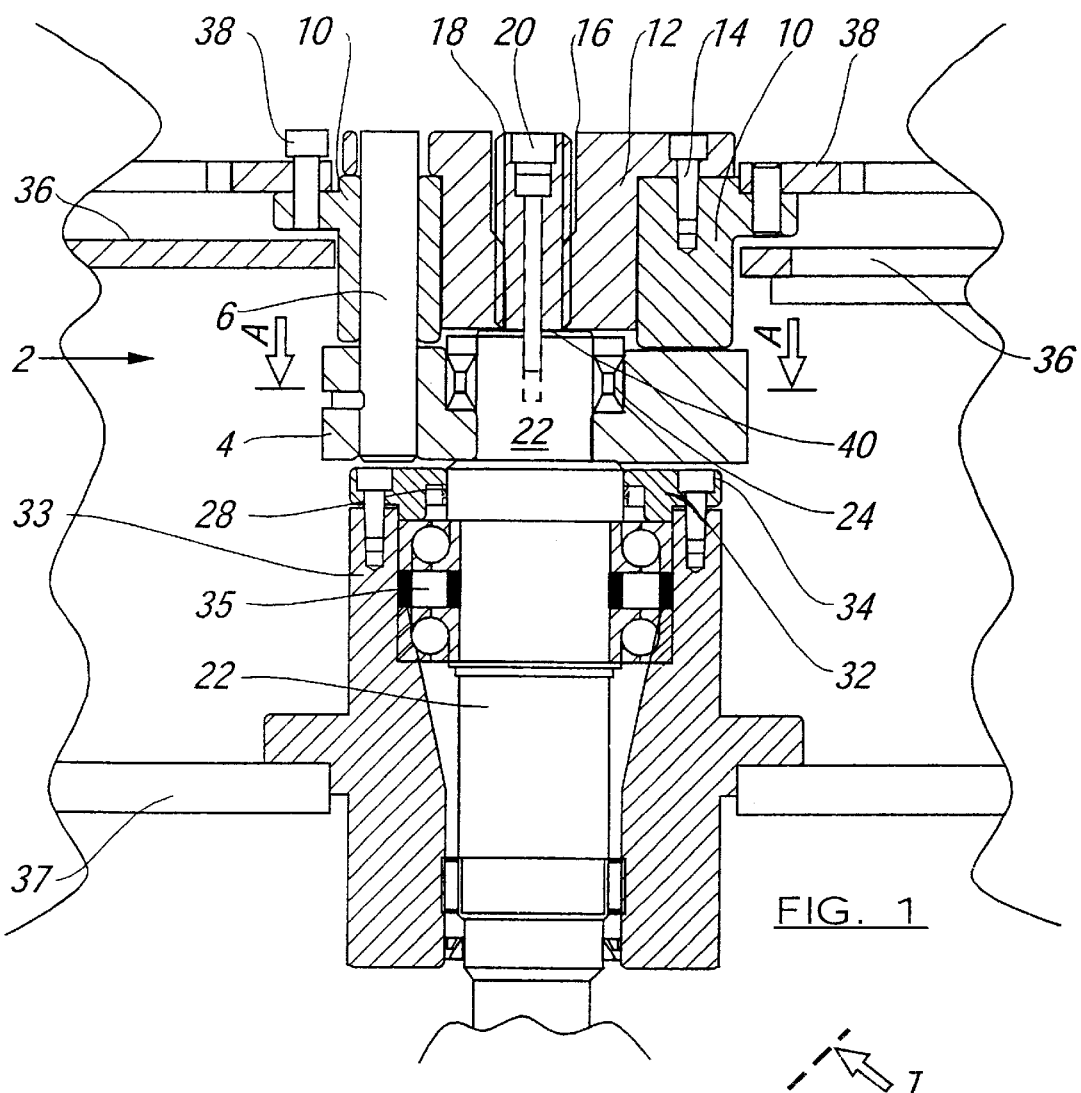
FIG. 1 shows a partial vertical sectional view of the mechanism according to the invention in its lowered condition.
Figure 1A:
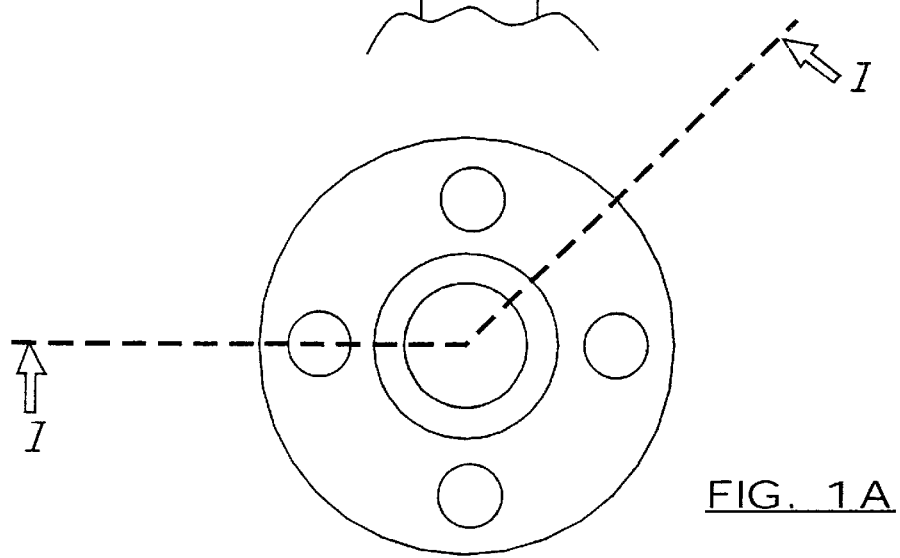

Referring firstly to FIG. 1, there is shown an axial displacement and locking mechanism 2 having a fixed portion 4 provided with vertically disposed guide dowels, one of which is shown at 6 and which is received in an aperture, only marginally greater in diameter than the dowel itself, of a bush 10. The said bush is rigidly secured by bolts 14 to an axially movable portion 12 which has a central aperture 16 tapped with threads of a pitch which correspond to those threads on the external surface of a height adjustment screw 18. Within said screw 18 is provided a locking screw 20 which serves to lock the axially movable portion 12 at a particular axial displacement relative to the fixed portion by being screwed into the upper surface of a rotationally driven spindle 22 thereof as shown in both FIG. 1 and FIG. 2.

An annular resilient member 24 is disposed around the outside of said spindle 22 and within the fixed portion 4 and resiliently supports the axially movable portion 12 when proximate thereto.

The spindle is enclosed by a bearing housing cover 32 secured to a cylindrical spindle sleeve 33 by bolts 34. An annular bearing assembly 35 is housed within said sleeve 33 and retained by said bearing housing cover 32.

A turret table 36 is rigidly secured to the stationery frame, indicated generally at 37 and to which the cylindrical spindle sleeve 33 is also secured, the uppermost end of the spindle 22 which stands proud of the bearing housing cover 32 facilitating the connection of the fixed portion 4, to which the annular bush 10 is in turn connected. The turret table 36 remains stationery relative to the drive shaft 30, whereas a turret plate 38 is attached to said annular bush and rotates therewith.

When it is desired to alter the axial displacement of the turret plate 38, a locking screw 20 is unscrewed to a sufficient extent to be completely removed from the uppermost end of the spindle 22, whereupon the height adjustment screw 18 can be rotated. As the lower end 40 of this screw abuts the upper substantially planar surface of the end of the spindle 22, the rotational motion of the screw is converted into axially vertical movement of the axially movable portion 12. Said portion 12 slides vertically upwardly on the guide dowels 6 which prevent any angular rotation of either the axially movable portion 10 or the turret plate 38 connected thereto, and thus the angular orientation thereof is preserved with respect to the various stations which the turret plate may serve.

Figure 2:
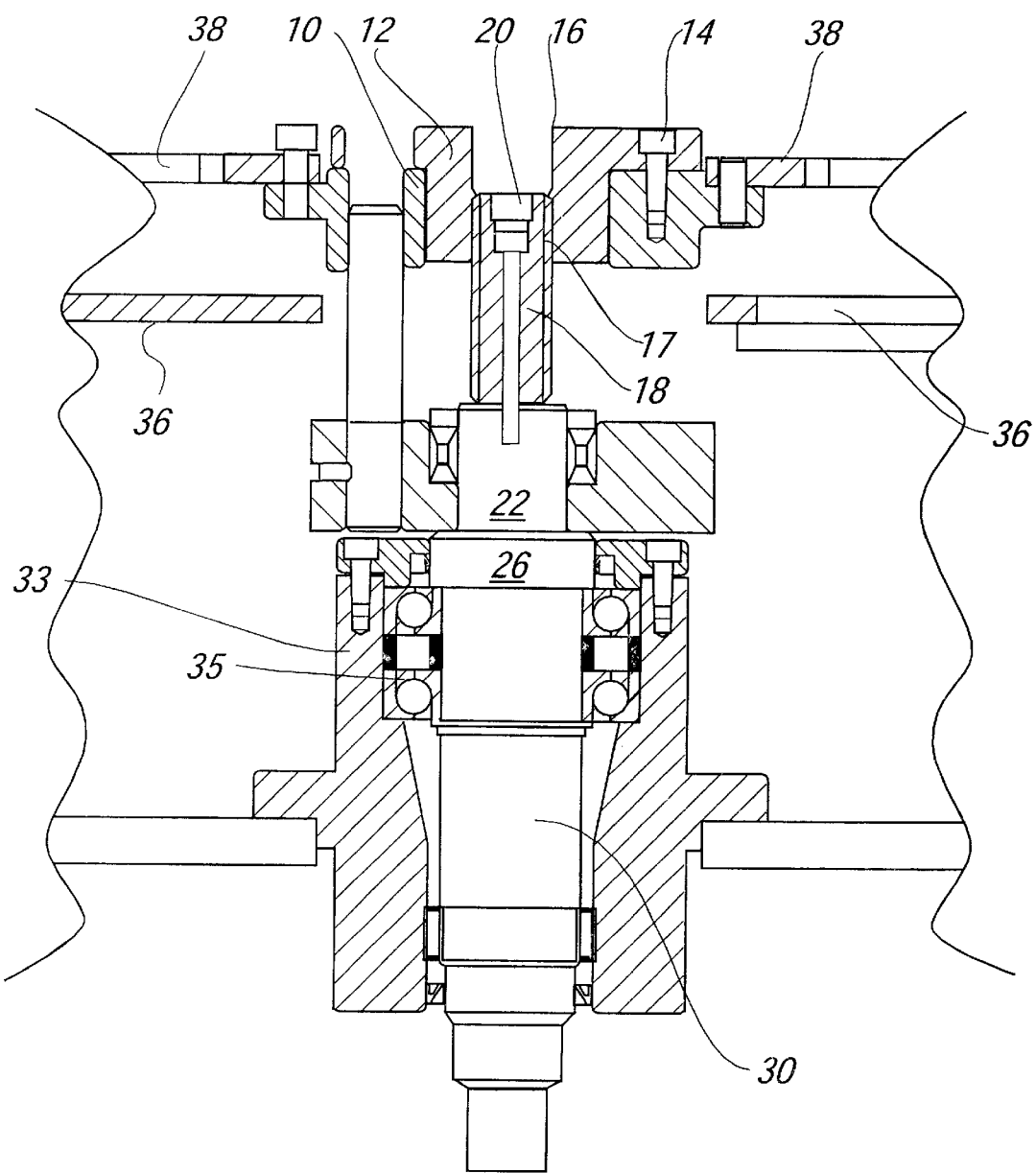
FIG. 2 shows a partial sectional view of the mechanism according to the invention in a raised condition.

Once a desired axial displacement of the turret plate is achieved, the further rotation of the height adjustment screw 18 is prevented by screwing the locking screw 20 back into the upper end of the spindle 22, as is shown in FIG. 2. Additionally, it can be seen in FIG. 2 that the aperture 16 of the axially movable portion is only provided with threads in a lower portion 17 thereof.

Figure 3:
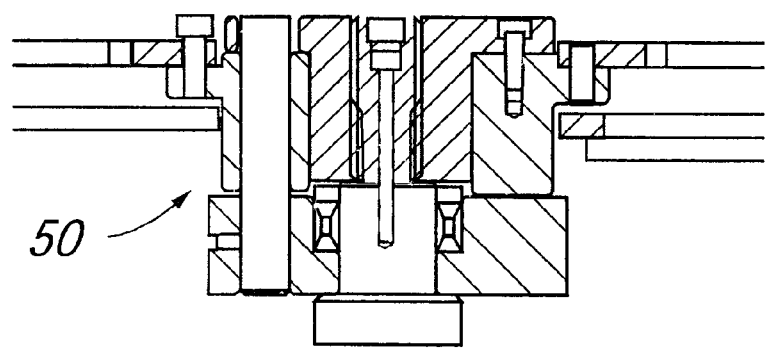
FIGS. 3–11 show the mechanism according to the invention provided with spacer elements of different heights.
Figure 4:
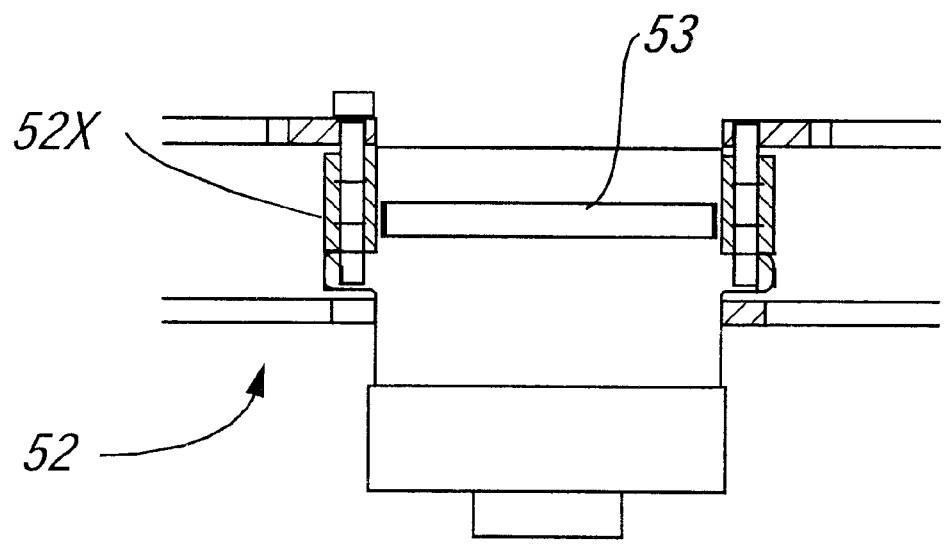

Referring finally to FIGS. 3–11, there is shown a number of differently configured mechanisms 50, 52, 54, 56, 58, 60, 62, 64, 66. The mechanisms 50, 52 shown in FIGS. 3, 4 are broadly identical to that shown in FIGS. 1 and 2, with the exception that in FIG. 4, the annular bush is of an increased height compared to that shown in FIGS. 1–3.

Figure 5:
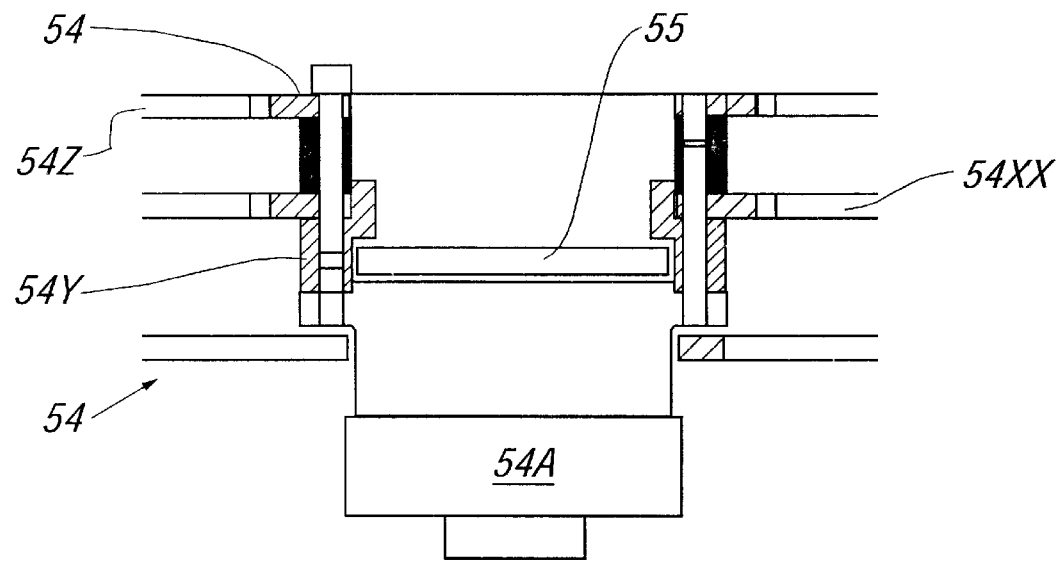
Figure 6:
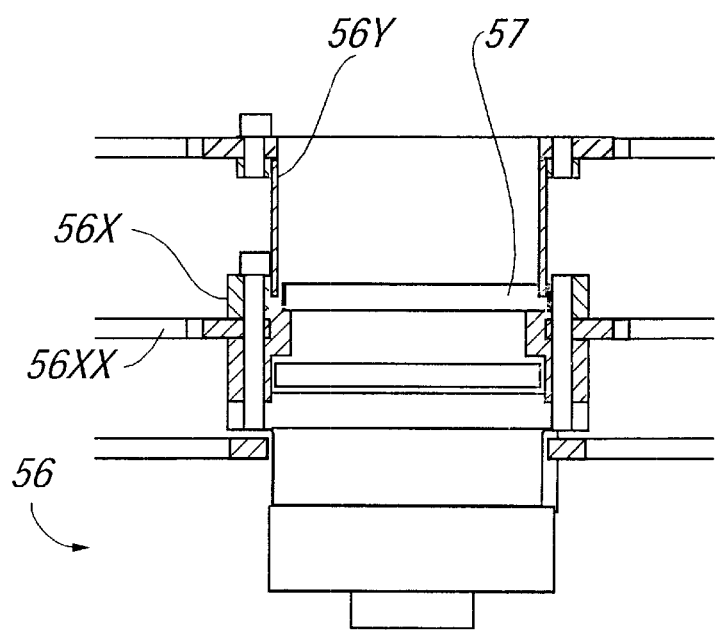
Figure 7:
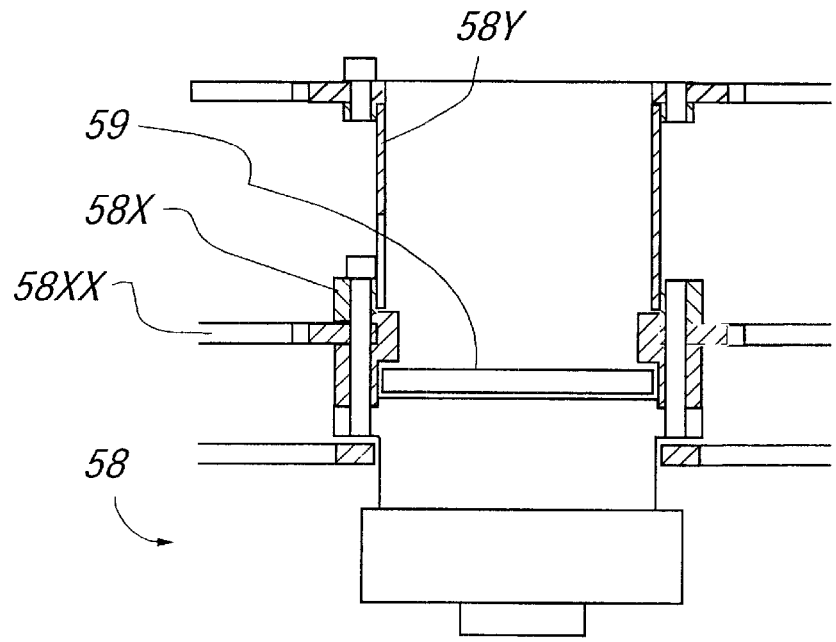
Figure 8:
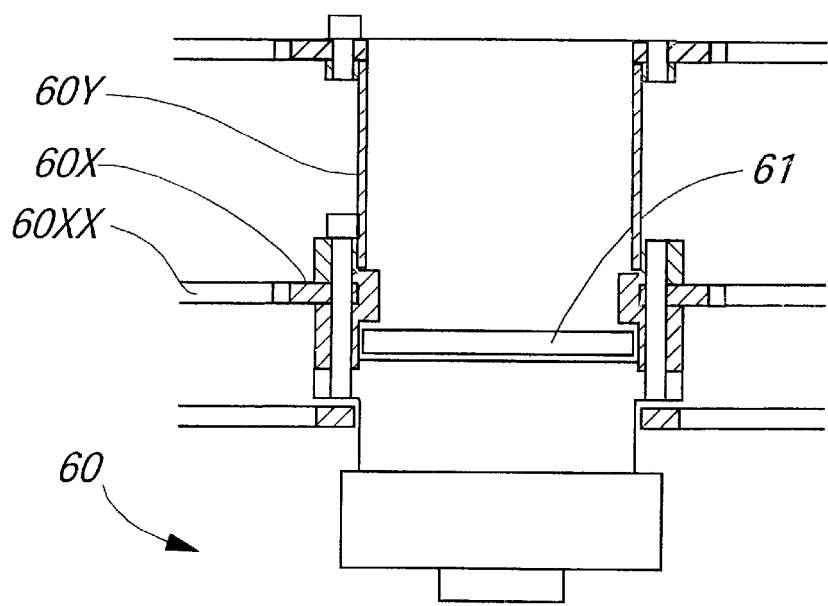
Figure 10:
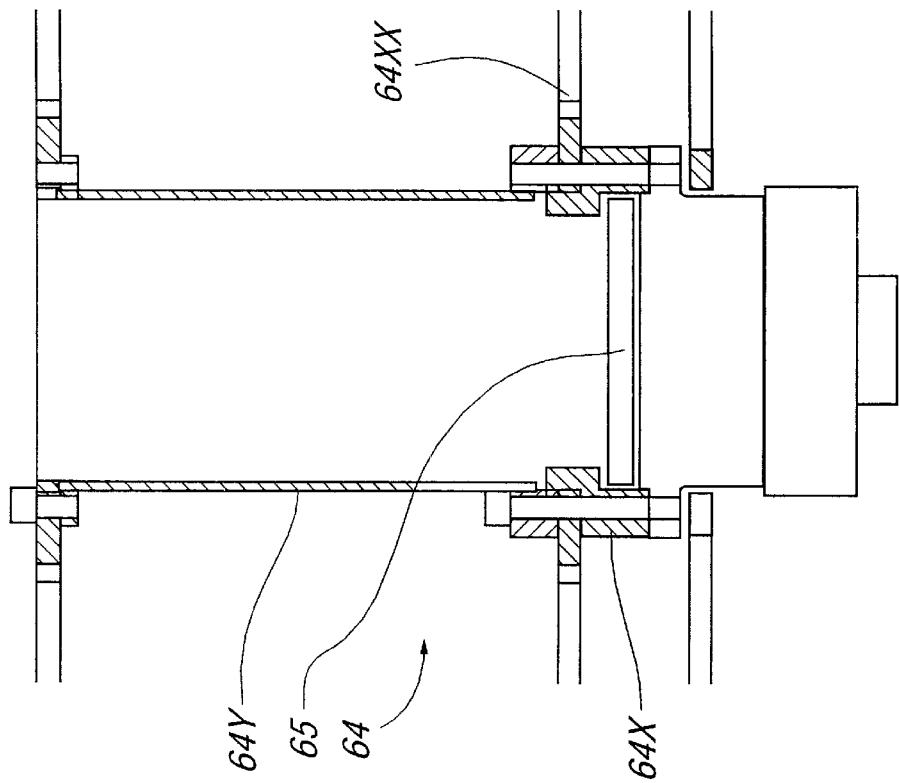
Figure 9:
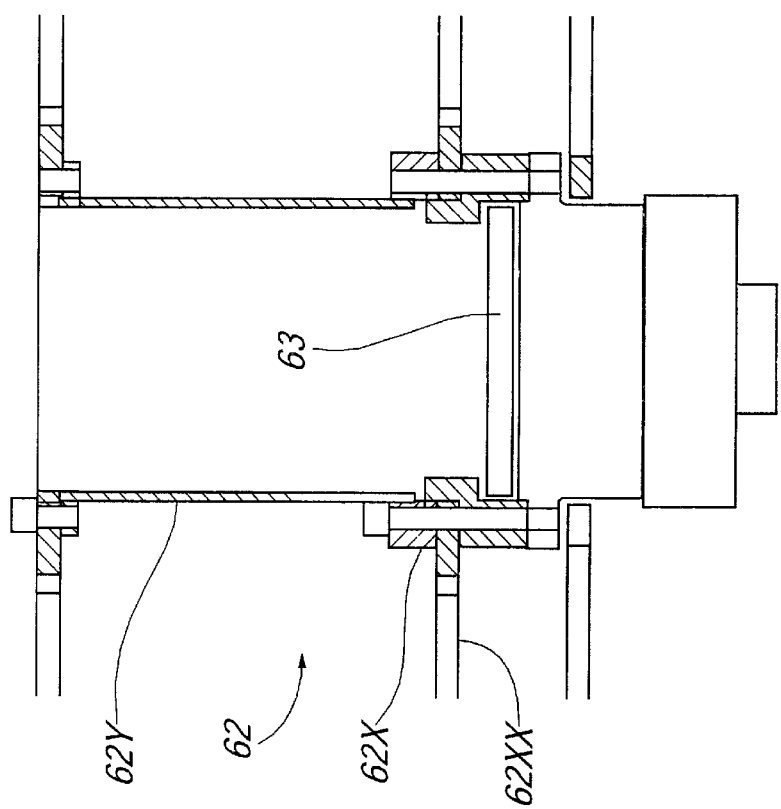
Figure 11:
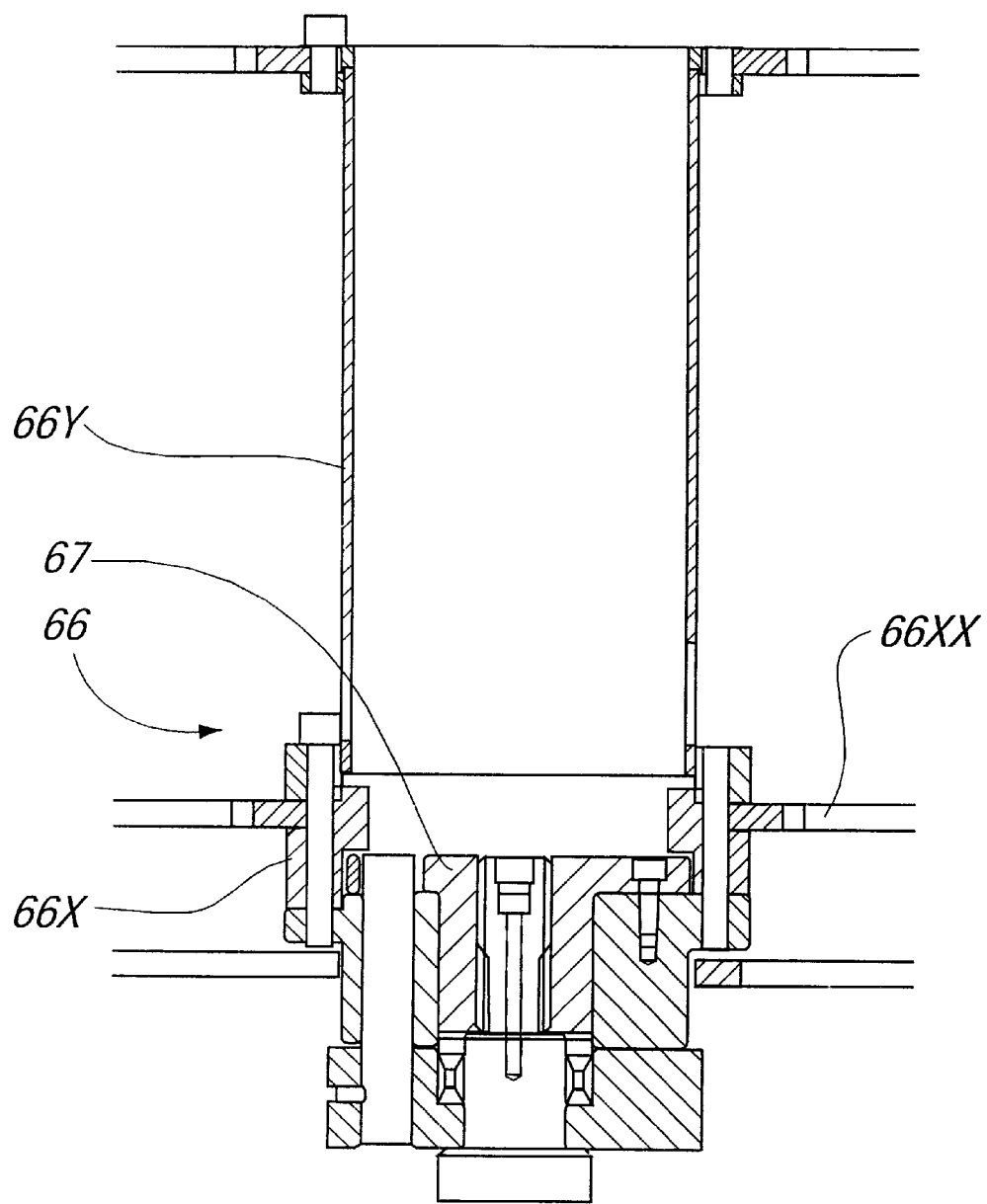

In FIG. 5, a composite annular bush element consisting of two separate parts 54X, 54Y is provided and together these serve to increase the starting displacement of a turret plate 54Z above the fixed portion 54A. In each of FIGS. 4–11, the uppermost surface of the axially movable element is shown at 53, 55, 57, 59, 61, 63, 65, 67 respectively.

Finally in FIGS. 6–11, the annular bush elements 56X, 58X, 60X, 62X, 64X, 66X are shown enhanced by the addition of a spacer element 56Y, 58Y, 60Y, 62Y, 64Y, 66Y thereto.

It should be pointed out that a secondary turret plate may be provided, shown for example at 54XX, 56XX, 58XX, 60XX, 62XX, 64XX, 66XX which is provided with similar or identical apertures or cut-away portion to the uppermost turret plate provided in the embodiments shown in FIGS. 6–11. Said secondary turret plate provides additional lateral support for a hollow tubular box section retained within said apertures or cut-away portions. Such support decreases the likelihood of said tubular section falling over during movement thereof as it slides over the turret table which supports it.

It will be instantly appreciated from the above that the proposed mechanism offers substantial variations in the axial displacement of a turret plate.

In summary therefore an axial displacement mechanism for precisely adjusting the axial displacement of a turret plate relative to a turret table is disclosed. Turret tables are commonly used to support a workpiece such as the hollow tubular section of a tin box immediately prior to the seaming of a lid thereto and are commonly angularly indexed between a plurality, usually four, separate work stations disposed above the turret plate. The turret table is rigidly secured to a frame while the turret plate must be capable of being axially displaced relative thereto to suit a variety of different components. The turret plate is rigidly secured to an annular bush through a central aperture of which passes a cylindrical screw, the threads of which engage in corresponding thteads in the inner annular surface of the bush. The screw abuts an axially fixed portion secured to or being a drive spindle which imparts motion to said fixed portion, said annular bush and said screw means to cause the turret plate to rotate. The provision of threads on the outside of the cylindrical screw and the abutment thereof with the spindle or fixed portion ensures that the rotation of the screw causes axial displacement of the annular bush and thus the turret plate relative to the turret table while the screw remains axially static. Guide means in the form of cylindrical pegs provided in the axially fixed portion are received through apertures in the annular bush to guide same and prevent angular displacement thereof as it is axially displaced. Locking means are provided to lock the screw to the spindle or other fixed portion to prevent unwanted rotation of same during rotation of the turret plate.

What is claimed is:

1. An axial displacement mechanism for a turret plate rotationally driven by a spindle to which said mechanism is rigidly secured or with which said mechanism is integral, said mechanism comprising an axially fixed portion and a movable portion capable of being moved axially relative to the fixed portion, said axially fixed and axially movable portions being rotated simultaneously when the spindle is drivingly actuated in use, said fixed portion comprising location means which are received in the movable portion, wherein said location means prevent said movable portion from rotating relative to the fixed portion and wherein the mechanism further comprises screw means separate from said location means, said screw means being provided with threads which engage corresponding threads in the axially movable portion such that rotation of the screw means causes axial displacement of the axially movable portion relative to the axially fixed portion on the location means to permit adjustment when the spindle is stationary.

2. An axial displacement mechanism according to claim 1, wherein the screw means is provided with an end surface which abuttingly interacts with the fixed portion or a component secured thereto, said screw means remaining substantially static relative to the fixed portion on rotation of said screw means.

3. An axial displacement mechanism according to claim 1, wherein said screw means also comprises secondary screw means which can be received in a threaded aperture within the fixed portion to lock said screw means to said fixed portion preventing the screw means from rotating relative to the fixed portion.

4. An axial displacement mechanism according to claim 1, wherein said turret plate is connected to the axially movable portion.

5. An axial displacement mechanism according to claim 1, wherein the axially movable portion comprises an annular bush through the center of which said screw means pass engaging threads provided on an inner surface of said bush.

6. An axial displacement mechanism according to claim 5, wherein the annular bush comprises spacer means which extend the overall height of the annular bush and allow for the connection of a plate at the uppermost extremity thereof.

* * * * *